Nov. 28, 1961  H. O. ANGER  3,011,057
RADIATION IMAGE DEVICE
Filed Jan. 2, 1958  2 Sheets-Sheet 1
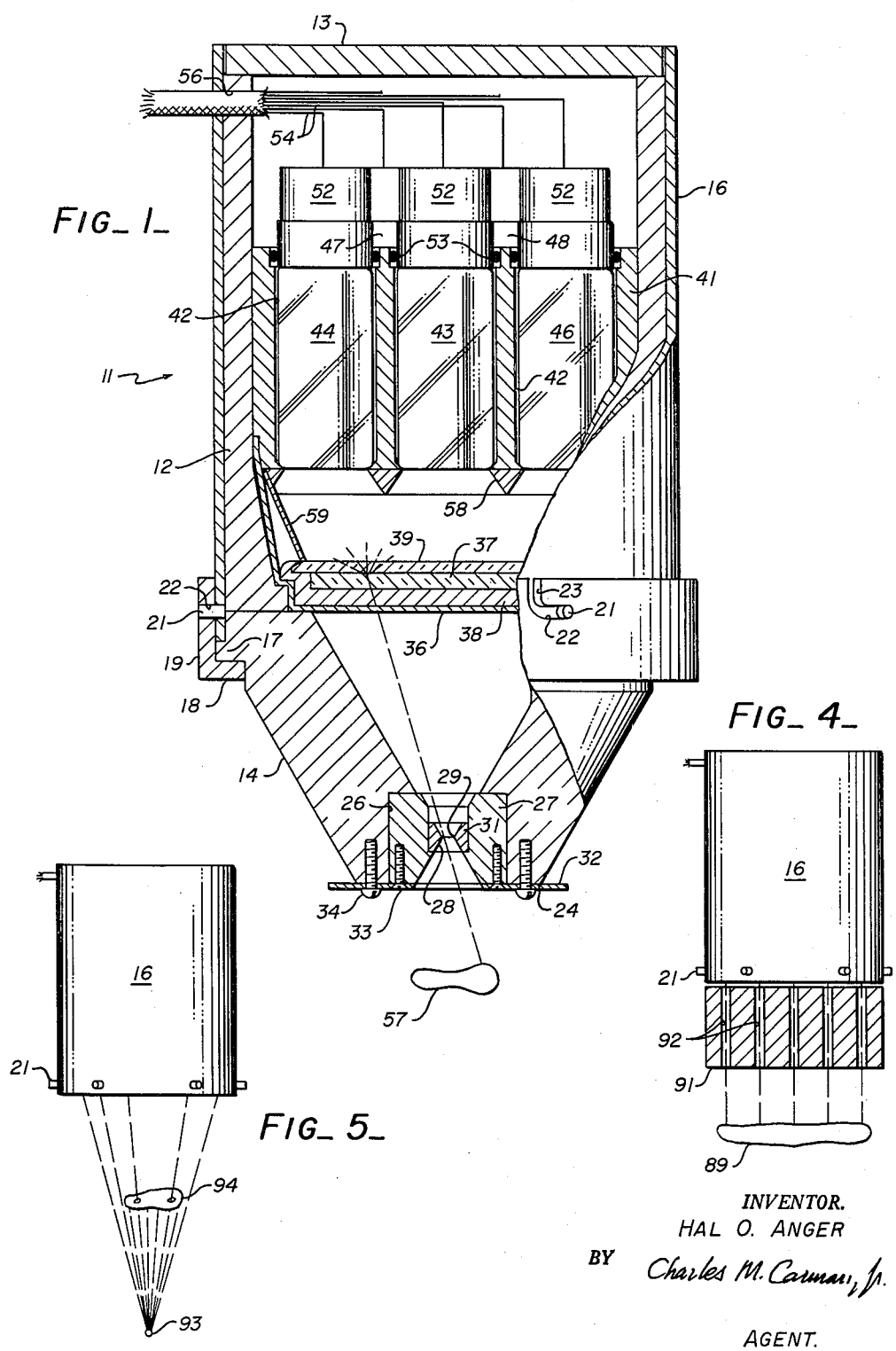
INVENTOR.
HAL O. ANGER
BY Charles M. Carman, Jr.
AGENT.

Nov. 28, 1961  H. O. ANGER  3,011,057
RADIATION IMAGE DEVICE
Filed Jan. 2, 1958  2 Sheets-Sheet 2
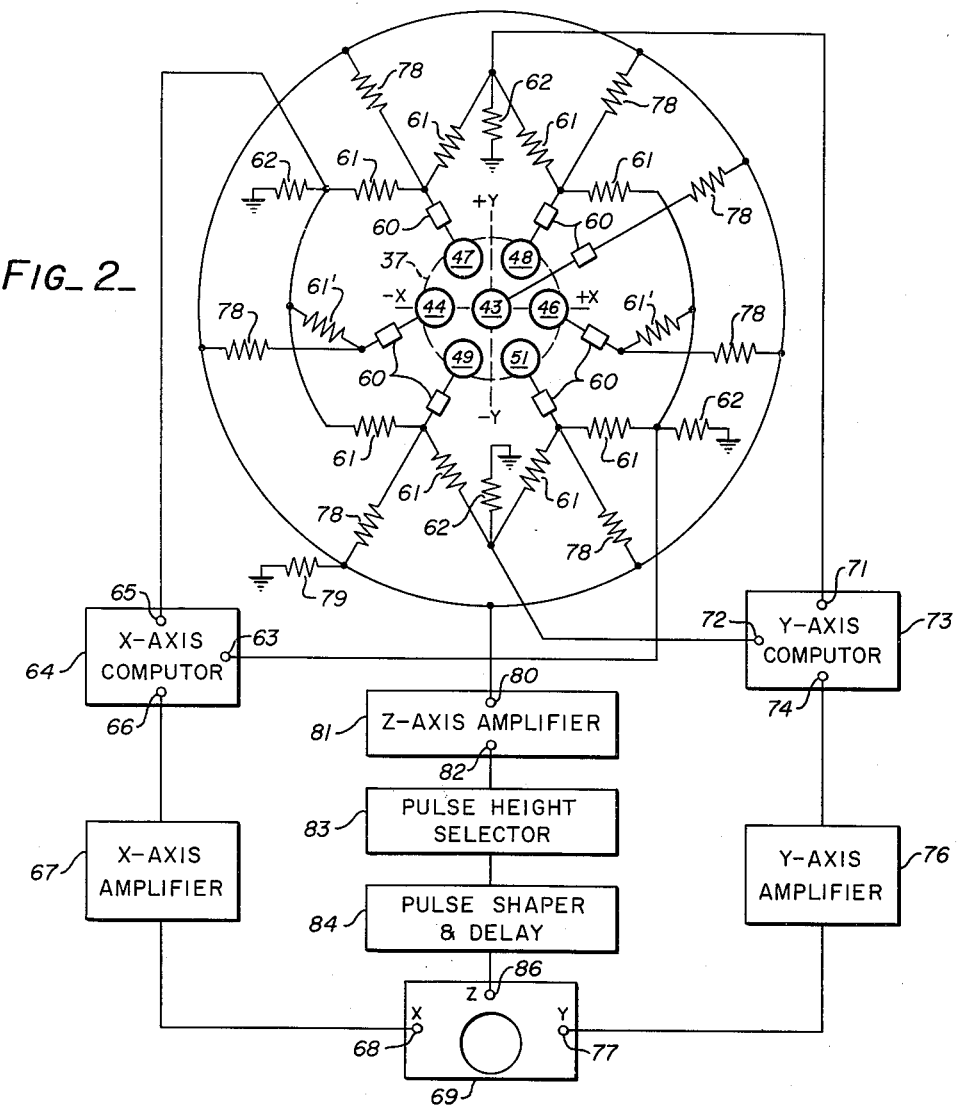
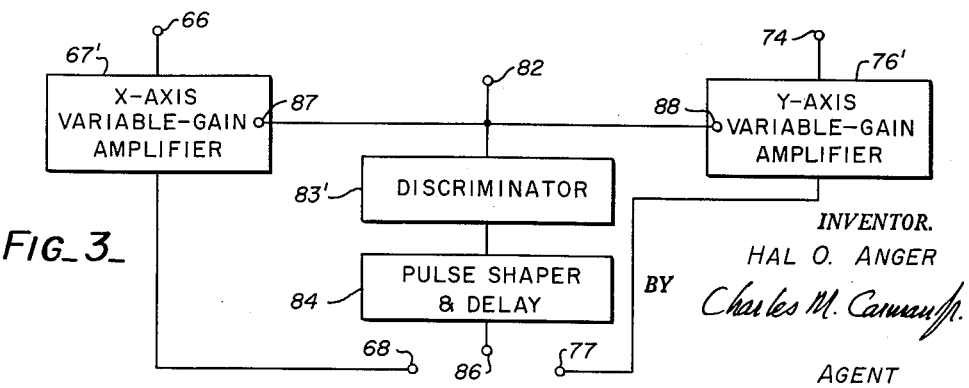
INVENTOR.
HAL O. ANGER
BY Charles M. Carman Jr.
AGENT

United States Patent Office 3,011,057
Patented Nov. 28, 1961

3,011,057
RADIATION IMAGE DEVICE
Hal O. Anger, 2032 E. 30th St., Oakland 6, Calif.
Filed Jan. 2, 1958, Ser. No. 706,825
18 Claims. (Cl. 250—71.5)

This invention relates to radiation detectors and particularly to instruments for surveying the disposition of a distributed radiation-source.

A relevant prior art has dealt with the mapping of bodies that are disposed in some way inaccessible to ordinary observation: of materials, for example, that have been purposely introduced into animal subjects. When such materials are radioactive, the disposition of the material can be recorded by exposing a photographic film to the emitted radiation, but the process requires a long exposure-time. In an improved method there is used a scintillator, i.e., a substance that emits flashes of visible light when struck by the radiation; and the visible light is photographed or is observed by other means. Thus the sensitivity of the detecting instrument, i.e., the amount of radiation detected per unit of exposure time, is manyfold increased.

An apparatus embodying this latter principle was described in United States Patent No. 2,779,876, January 29, 1957, by Cornelius A. Tobias and the present inventor; but in this apparatus the visible light emitted from the scintillator is gathered by a limited number of immediately proximal light-detectors, each of which exclusively surveys a substantial portion of the scintillator; and no provision is made for detecting the position of a scintillation with any greater accuracy than is embodied in deciding which of the surveyed portions the scintillation occurs within. Also this apparatus has no effective provision for eliminating spurious signals caused by background and other undesired radiation.

In the present invention, a signal-sensing means (for example, several phototubes of standard manufactnure) is disposed facing a signal means (for example, a scintillator) which emits a surge of signal matter (for example, visible light) in response to a signal incident radiation stimulus (for example, a single gamma ray). The phototubes are particularly spaced at a moderate distance from the scintillator so as to survey overlapping areas thereof. Thus each phototube subtends a portion of each surge of light, and each individual scintillation is reported by several of the phototubes. Each phototube gauges the remoteness of the scintillation by measuring the amount of light received. The electrical signals from the phototubes are compared in a computing circuit, which reports the precise location of each scintillation in relation to a predetermined coordinate system in the scintillator. The computing-circuit signals are applied to a cathode-ray oscilloscope to deflect the beam thereof and to make a visible spot on the oscilloscope-screen at a point corresponding to the location of the original scintillation in the scintillator. A pulse-height-selector circuit is provided to eliminate undesired signals such as those produced by background and scattered radiation. Thus the oscilloscope is made to display an image of the radiation source only, with each desired scintillation precisely plotted.

Accordingly it is an object of the invention to provide a new and improved radiation detector.

Another object of the invention is to provide an instrument for the more accurate survey of a distributed radiation source.

Another object is to provide an instrument for the selective detection of a desired type of radiation only.

A further object is to provide an instrument for the more rapid detection of small amounts of radiation.

Other objects and advantages of the invention will be made clear in the following description, which is to be taken in conjunction with the accompanying drawing, of which—

FIGURE 1 is a partly cut-away elevation view of a mechanical portion of the invention;

FIGURE 2 is a schematic diagram of an electrical circuit of the invention;

FIGURE 3 is a diagram showing a variation of the circuit shown in FIGURE 2;

FIGURE 4 is a diagram showing an alternative way of using the invention; and

FIGURE 5 is a diagram showing another way of using the invention.

Referring now to the drawing, FIGURE 1, there is shown a camera housing 11 comprising a generally tubular body 12 covered at one end by a cover-disk 13 and at the other end by a hollow nose-cone 14. All three elements are made of radiation-opaque material such as lead. A tubular steel protective-jacket 16 is force-fitted peripherally around the body 11 and is extended loosely around adjacent portions of the cover-disk 13 and the nose-cone 14, serving to hold the leaden elements in axially-aligned assembly. A peripheral flange 17 is formed on the nose-cone 14 to mate with an inwardly-extending peripheral flange 18 on a retaining-ring 19, which in turn extends around the adjacent end of the jacket 16 and helps to hold the body and cone together. Ring 19 and jacket 16 are secured together by a number of radially-aligned studs 21 projecting through stud-holes 22 in the ring, and force-fitted into the jacket. Stud-holes 22 are extended to form slots circumferentially aligned in the ring, and are met by angled slots 23 extending to an edge of the ring, so that the ring may be rotated and removed when it is desired to disassemble the body 12 and cone 14.

The tip of the nose-cone 14 is truncated to form a flat face 24 and is hollowed to form a recess 26 for the seating of any one of a number of interchangeable nose-inserts 27. Each nose-insert 27 is made of the same material as the nose-cone 14 and differs from the other nose-inserts only in the diameter of a pin-hole-aperture 28 that is centrally located therein for the collimation of radiation originating remotely from the camera. Each nose-insert 27 is cut away internally to leave the pin-hole-aperture 28 defined to the view of the radiating body mainly by a sharp-edged internal peripheral ridge 29. In the present embodiment the ridge 29 is actually carried by a nose-insert-insert 31 made of extra-high-density material such as platinum and force-fitted into the nose-insert 27 for reducing the amount of radiation that unavoidably passes through the comparatively thin crest of the ridge 29. A suitably apertured plate 32 is secured as by threaded bolts 33 and 34 respectively to the insert 27 and the flat face 24 of the nose-cone 14, so that the insert is rendered removable and interchangeable.

For the purposes of this description, consider that the invention is to be operated with the axis vertical and with the nose-cone 14 pointing downwardly. Thus, for the mounting of the scintillator, the lower end of the body 12 is internally flanged to support a correspondingly step-sided scintillator-retaining-cup 36, which is disposed cavity-upward within the body 12. A scintillator 37 made of thallium-activated sodium iodide crystal and having the form of a thin disk, is enclosed at bottom and sides in a mounting-frame 38, is covered by a transparent glass cover-disk 39, and is coaxially disposed in the bottom of cup 36. Substantially spaced above the scintillator 37, and supported by the rim of cup 36, is coaxially disposed a cylindrical phototube-magazine 41. The magazine 41 has formed therein a number of vertical bores 42 in which are mounted, sensitive-endsdownward, a number of phototubes 43, 44, 46, 47, 48, 49 and 51 (but phototubes 49 and 51 are shown only in FIGURE 2). Any suitable number of phototubes may be used, but in the present embodiment there are seven: one centrally disposed and six arrayed thereabout in the pattern of a hexagon. At the upper ends of the bores 42 are disposed seven sockets 52 into which the phototubes are electrically plugged; and the phototube-bases are wedged into the bores by means of peripherally-disposed toroidal-seals 53. A set of electrical conductors 54 is connected to the phototubes through the sockets 52, and the conductors are extended to the exterior of the apparatus through an aperture 56.

It is noted that the sensitive ends of the phototubes 43, 44, 46, 47, 48, 49 and 51 are particularly spaced away from the upper surface of the scintillator 37, and that the lower portions of the bores 42 are narrowed especially for the purpose of positioning the phototubes with the sensitive surfaces thereof disposed all at precisely the same height above the scintillator. This spacing feature is of major importance in the invention, for assuring that each phototube has view of a major portion of the scintillator and is therefore in a position to assist in computing the location of each scintillation that occurs. Such a scintillation is shown in the figure as produced by a gamma-ray emitted from a radioactive body 57 disposed beneath the pin-hole-aperture 28 of the camera. Each scintillation in the scintillator 37 emits a quantity of visible light, initially distributed evenly in all directions; and an exclusive quantity of this light is received by each of the phototubes. The actual amount of light that falls on the face of each phototube is proportional to the solid angle of a cone the apex of which is located at the point of scintillation and the base of which is defined by the periphery of the phototube-face. The more remote is the scintillation from a particular tube, the smaller is the solid angle defined by the face of the tube, and the smaller is the amount of light received by that tube. When the signals emitted by all of the tubes, disposed in the structure as described above, are compared as by the electrical computing circuits to be described below, the light-intensity information produced by the phototubes is converted into position information that describes the location of the scintillation in the plane of the scintillator 37. Some inaccuracies that occur may be corrected, as has been proved in practice, by means of additional features that are shown in the figure: A wall 58 of V-shaped cross-section, oriented with the sharp edge downward, is disposed circumvallating (peripherally encircling) each bore 42 below the plane of the phototube-faces; and the walls 58 are affixed to the magazine 41. The exposed surfaces of the walls 58 may be coloured white or black as desired, for increasing or decreasing the reflection of light. Also, a reflecting mirror 59 in the form of a transverse section of a hollow cone, is disposed with the larger open end affixed to the periphery of the lower end of magazine 41 and with the smaller open end touching the periphery of the scintillator cover-disk 39. Also, the cup 36 is filled with an optical fluid, such as mineral oil, up to the level of the phototube-faces. These features serve to direct and apportion the quantities of light that are received by the various phototubes, and have been found to improve the operation of the camera.

Turning now to FIGURE 2, the phototubes 43, 44, 46, 47, 48, 49 and 51 are shown in schematic plan view, arrayed as previously described above the scintillator 37; the output of each phototube being coupled to a respective pre-amplifier circuit 60, conventional in the art. For convenience the array is particularly shown in schematic relation to an X-axis and a Y-axis centered beneath the center phototube 43, the X-axis passing beneath two oppositely-disposed phototubes 44 and 46, and the Y-axis passing between phototubes 47 and 48 and between phototubes 49 and 51, as required in view of the hexagonal arrangement. To sense the location of a scintillation in the scintillator 37, it is necessary to sense the displacement of the scintillation in relation to both the X-axis and the Y-axis. Considering first the X-axis sensing, the figure shows how the preamplified outputs of the three phototubes 46, 48 and 51, lying on the X-positive side of the Y-axis, are coupled together, each through a resistor 61 (61' for phototube 46), and how the coupled group is in turn coupled across a grounded resistor 62 to a first input-terminal 63 of an X-axis-computor circuit 64. This arrangement comprises a typical summing circuit, providing a signal to the computor 64 that is proportional to the sum of the individual voltage signals coming from the three phototubes. Similarly, the pre-amplified outputs of the three phototubes 44, 47 and 49 lying on the X-negative side of the Y-axis are coupled each through a resistor 61 (61' for phototube 44) and the group across a grounded resistor 62, to deliver a summed signal to a second input-terminal 65 of the X-axis-computor circuit 64. In the present embodiment, the phototubes 44 and 46 are each located twice as far from the Y-axis as are the phototubes 47, 48, 49 and 51; and the resistors 61' corresponding with the phototubes 44 and 46 are each accordingly made to be of a resistance-value approximately one-half that of any resistor 61. Thus adjustment is made for differences in the strengths of signal, that would otherwise be a result of the spatial displacement.

The X-axis-computor circuit may be either of a type that produces a signal proportional to the arithmetic difference between the values of the two input signals, or of a type that computes the ratio, both types being well-known in the computor art. In particular, a special arrangement providing an output that represents the difference between the input signals divided by the sum of all of the signals from all of the phototubes (the Z-axis signal), has been found to be of particular value for some uses of the invention: this arrangement is shown in FIGURE 3 and will be described hereinafter. But returning to FIGURE 2, with either type of circuit for X-axis-computor 64, the magnitude and polarity of the output signal is still a function of the displacement along the X-axis of the original scintillation. Accordingly, the output-terminal 66 of the computor 64 is coupled through an amplifier 67 to the X-axis (horizontal beam-deflection) terminal 68 of a cathode-ray oscilloscope 69.

The pre-amplified outputs of the pair of phototubes 47 and 48 lying on the Y-positive side of the X-axis, and the outputs of the pair 49 and 51 lying on the Y-negative side, are likewise coupled through a set of equal-value resistors 61, and the two groups each across a grounded resistor 62, to opposite input-terminals 71 and 72, respectively, of a Y-axis-computor circuit 73; and the output terminal 74 of the computor 73 is coupled through an amplifier 76 to the Y-axis (vertical beam-deflection) terminal 77 of the oscilloscope 69. In a similar manner then, the Y-axis-computor 73 applies to the oscilloscope a signal representing the displacement of the scintillation along the Y-axis of the scintillator 37.

The circuits thus described provide for the deflection of the cathode-ray beam of the oscilloscope to a point having a relative displacement in the X- and Y-directions from the center of the oscilloscope screen, this displacement being proportional in distance to, and corresponding in polarity with, the displacement of the stimulating scintillation from the intersection of the X- and Y-axes of the scintillator 37. It is desirable also to have the beam of the oscilloscope operate only for a brief instant, so as to make but a spot on the screen, and this only when a scintillation has actually occurred and when the required displacement of the beam has been provided for. Accordingly, the pre-amplified outputs of all of the phototubes 43, 44, 46, 47, 48, 49 and 51 are coupled together, each through a summing resistor 78, and the entire array is in turn coupled across a grounded resistor 79 to the input-terminal 80 of a Z-axis-amplifier 81. The output-terminal 82 of the amplifier 81 is in turn coupled through a pulse-height-selector circuit 83, and a pulse-shaper-and-delay circuit 84, to the Z-axis (blanking-unblanking) terminal 86 of the oscilloscope 69. The oscilloscope being normally blanked (i.e., the beam turned-off), the signal arriving at the Z-axis terminal 86 constitutes an unblanking signal, which turns-on the beam momentarily, making a spot on the oscilloscope screen. The pulse-height-selector 83 is of a type well-known in the art; it is adjusted to emit an unblanking signal only when the summed and amplified signal collected from the seven phototubes falls within a preselected range of magnitude, such range corresponding to a desired range of radiation-energy. Thus when it is desired to record the impingement of, for example, 0.365-mev. gamma-rays, the pulse-height-selector 83 is adjusted to produce an unblanking signal only when the scintillator 37 responds to a photoelectric recoil from a gamma-ray of that energy. Any 0.365-mev. gamma-rays which have been scattered in the subject will have lost energy in the process and will fail to produce an unblanking signal. Background radiations of greater or lesser energy will fail to produce a signal for the unblanking of the oscilloscope.

The pulse-shaper-and-delay circuit 84 is also of a type well-known in the art, and is used to shape the unblanking signals to forms suitable for reception by the oscilloscope, and to delay the unblanking signals until the oscilloscope has had time to receive and to respond to the beam-positioning signals from the X- and Y-axis computors 64 and 73.

If it is desired to make sensings of Compton-recoil events only, as is sometimes useful, the pulse-height-selector 83 is adjusted to accept the desired lower-energy range. If it is desired to show both Compton and photoelectric recoils, an alternative circuit arrangement is used, as shown in FIGURE 3. Therein is shown how the X- and Y-axis amplifiers 67 and 76 are replaced by variable-gain-amplifiers 67' and 76', both of a type known in the art, for transmission of the beam-positioning signals to the terminals 68 and 77 of the oscilloscope. The amplifiers 67' and 76' have gain-control input-terminals 87 and 88, respectively, which are coupled directly to the Z-axis-amplifier output-terminal 82. The Z-axis signal thus controls the gains of amplifiers 67' and 76' so that a naturally weak scintillation produces as great a deflection of the oscilloscope-beam as would a scintillation of greater light-emitting energy occurring at the same point in the scintillator. This arrangement in effect produces an arithmetical division of the X- (or Y-) axis positioning signal by the Z-axis signal, as previously mentioned.

Also, in this circuit, the pulse-height-selector 83 is replaced by a Z-axis discriminator circuit 83', also of a type well-known in the art. The discriminator 83' is adjusted to accept and pass unblanking signals from scintillations of various magnitudes, including those caused by Compton and photoelectric recoils from gamma-rays of a given energy, or by gamma-rays of various energies. Thus in this circuit all desired forms of radiation, despite their differences in energy, produce uniform unblanking and correct positioning signals for the oscilloscope.

In practice the apparatus is operated for exposures of from a few seconds to several minutes, and a cumulative photograph is made of the spots appearing on the oscilloscope screen. For short exposures there is photographed an image composed of white dots on a dark background, and for long exposures the image appears as an integrated mass, with varying intensities of radiation in different parts of the subject discernable in shades of grey and white.

Another way to use the apparatus is to employ a standard memory-tube in the oscilloscope to produce a cumulative image of the source, the image being retainable for long enough to be of diagnostic use without needing to be recorded permanently in film.

Still another way to us the apparatus is shown in FIGURE 4. In this figure the apparatus is disposed without the nose-cone 14 and associated elements, for surveying a large radioactive body 89. A thick block 91, made of radiation-opaque material and perforated for a number of parallel elongated collimation-channels 92, is interposed between the camera and the body 89. Only radiation proceeding in a vertical upward direction is passed by the channels 92, and each scintillation is thus made to be in the same relative location in the scintillator as the corresponding source-point was in the body 89. If the block 91 is moved horizontally during the exposure period, without moving the camera, complete coverage of the body 89 is obtained.

A further way to use the apparatus, again without the nose-cone 14, is shown in FIGURE 5. A point-source 93 of radiation is placed beneath the camera and a radiation-opaque body 94 is interposed between. This arrangement produces a shadow-image of the body 94 on the oscilloscope-screen, and if the body 94 is in any part transparent to the radiation, the location and degree of transparency is displayed. This arrangement is useful for the inspection of industrial products.

While the invention has now been described with respect to several embodiments, it will be apparent that numerous modifications can be made without departing from the spirit and scope of the invention, and it is therefore not desired to limit the invention to the exact details shown except insofar as they are defined in the following claims.

What is claimed is:

1. In a radiation-detector responding to the incidences of individual radiation stimuli, the combination comprising, a collimator for said radiation, a scintillator disposed at the downstream end of said collimator for the manifestation of said incidences, a plurality of photoelectric tubes disposed in view of substantially co-extensive portions of said scintillator, and image-display means connected to said photoelectric tubes for receiving the signals emitted therefrom and for translating said signals into relatively-displaced images of said incidences, the relative displacements of said images corresponding with the relative displacements of said incidences in said scintillator, and the pattern of said images forming a pattern-image of all of said incidences.

2. The combination as described in claim 1, wherein said collimator comprises a point-source of radiation and an at-least-partly radiation-opaque body, said body being disposed in the path of said radiation from said point-source.

3. The combination as described in claim 1, wherein said collimator comprises a collimating-screen composed of radiation-opaque material, said screen having at least one collimating-aperture formed therein.

4. The combination as described in claim 3, wherein said screen has a plurality of apertures in the form of elongated bores, said bores being aligned to be axially-parallel.

5. The combination as described in claim 1, wherein a first sub-plurality of said photoelectric tubes is distributed on both sides of an X-axis lying in the plane of the visible-light-sensitive faces of said photoelectric tubes, and a second sub-plurality of said tubes is distributed on both sides of a corresponding Y-axis; and wherein said image-display means comprises first and second signal-comparison circuits coupled respectively to said first and second tube-sub-pluralities, each circuit being particularly coupled from the tubes lying on one side of the corresponding axis to the tubes lying on the other side of said axis, for indicating the displacement of each manifestation away from said axis.

6. The combination described in claim 5, wherein each of said sub-pluralities comprises at least four photoelectric tubes distributed with at least two on each side of the corresponding axis, and wherein four signal-summing circuits are provided, all of the tubes on each side of each axis being coupled to the corresponding signal-comparison circuit through one of said signal-summing circuits.

7. The combination as described in claim 6, wherein are provided two variable-gain amplifiers each coupled to the output terminal of one of said signal-comparison circuits; a fifth signal-summing circuit coupled to all of said photoelectric tubes together, the output terminal of said fifth signal-summing circuit being coupled respectively to the gain-control terminal of each of said variable-gain amplifiers for controlling the strengths of the output signals thereof; a discriminator circuit coupled to the output terminal of said fifth signal-summing circuit; and display means coupled to the output terminals of said variable-gain amplifiers for indicating the strengths of the output signals thereof, said discriminator circuit being coupled to an activation terminal of said display means for selectively activating said display means only when the output signals from said signal-summing circuits are induced by radiation of a pre-determined energy.

8. The combination as described in claim 6, wherein is provided a fifth signal-summing circuit and a pulse-height-selector circuit, all of said photoelectric tubes being coupled to said pulse-height-selector through said fifth signal-summing circuit; and display means coupled to said signal-comparison circuits for receiving and displaying the output signals thereof, said pulse-height-selector being coupled to an activation terminal of said display means for selectively activating said display means only when the output signals of said signal-summing circuits are inducted by radiation of desired energy.

9. In a radiation-detector, the combination comprising, a scintillator in the form of a planar sheet for disposing transverse to the path of said radiation; seven photoelectric tubes disposed with the visible-light-sensitive faces thereof aligned in a plane parallel to and spaced from said plane of said scintillator and on the downstream side of said scintillator, and with the solid-angle-of-view of each tube including said scintillator, a first of said tubes being positioned at the intersection of an X- and a Y-axis taken as lying in the plane of said tube-faces, the remaining six of said tubes being positioned in an hexagonal cluster about said first tube, two of said remaining six tubes being particularly disposed upon the Y-positive side of said X-axis, two upon the Y-negative side thereof, three upon the X-positive side of said Y-axis, and three upon the X-negative side thereof; two input-signals-comparison computing circuits; two first summing-resistors each coupled by one end to one of said Y-positive tubes and by the other end to a first input-terminal of a first of said computing circuits; two second summing-resistors each coupled by one end to one of said Y-negative tubes and by the other end to a second input-terminal of said first computing circuit; three third summing-resistors each coupled by one end to one of said X-positive tubes and by the other end to a first input-terminal of said second computing circuit; three fourth summing-resistors each coupled by one end to one of said X-negative tubes and by the other end to a second input-terminal of said second computing circuit; four first grounded-resistors each coupled to one of said computer input-terminals; a pulse-height-selector circuit; seven fifth summing-resistors each coupled by one end to one of said tubes and by the other end to an input terminal of said pulse-height-selector; a second grounded-resistor coupled to said input-terminal of said pulse-height-selector; a cathode-ray oscilloscope having X-, Y- and Z-axis input-terminals, the output-terminal of said first computing circuit being coupled to said Y-axis terminal, the output-terminal of said second computing circuit being coupled to said X-axis terminal, and the output-terminal of said pulse-height-selector being coupled to said Z-axis terminal; and a radiation-collimator disposed on the upstream side of said scintillator.

10. The combination described in claim 9, wherein said collimator comprises a hollow housing composed of radiation-opaque material, said housing having a pinhole aperture formed therein for the collimation of said radiation, and said housing being disposed enclosing said scintillator and said photoelectric tubes, and with said pinhole-aperture thereof aligned on the upstream side of said scintillator.

11. The combination described in claim 9, wherein said input-signals-comparison computing circuits each comprise an input-signals arithmetic-difference computing circuit.

12. The combination described in claim 9, wherein said input-signals-comparison computing circuits each comprise an input-signals ratio-computing circuit.

13. A detector responding to single incident radiation stimuli comprising: signal means emitting a surge of signal matter in response to each of said incident stimuli, said surges being relatively displaced in proportion to the relative displacements of said stimuli incidences in said signal means; a signal-sensing means disposed viewing said signal means and positioned for subtending a portion of each surge, said portions being related as a function of said relative displacements; and image-display means connected to said signal-sensing means for receiving said sensings therefrom and for translating said sensings into relatively-displaced images of said incidences, the relative displacements of said images corresponding with the relative displacements of said incidences in said signal means, and the pattern of said images forming a pattern-image of all of said incidences.

14. The combination as described in claim 13 and also including a radiation-collimating means defining a radiation-path acceptance zone and having a selective display-blocking element connected to said detector for blocking display of all images but those associated with stimuli having paths aligned through said zone.

15. A radiation image device comprising, means producing a plurality of light sources delineating an image, a plurality of phototubes positioned for viewing said light sources and having electric outputs responsive thereto, and electric circuit means connected to said tubes and resolving said outputs of said tubes in response to each light source into coordinate electric signals corresponding to be coordinates of position of each said light source.

16. A radiation image device comprising, means producing a plurality of relatively weak light sources delineating an image, a plurality of phototubes positioned for viewing said light sources and having electric outputs responsive thereto, electric circuit means connected to said tubes and amplifying and resolving said outputs in response to each light source into coordinate electric signals corresponding to the coordinates of position of each said light source, means producing a spot, and means connected to said circuit means and energized by said signals to position said spot in accordance with said co-ordinates thereby reproducing said image.

17. A radiation image device comprising, means producing a plurality of relatively weak light sources delineating an image, a plurality of photo tubes positioned for viewing said light sources and having electric outputs responsive thereto, electric circuit means connected to said tubes and amplifying and resolving said outputs in response to each light source into coordinate electric signals corresponding to the coordinates of position of each said light source, and an oscilloscope connected to said circuit means and energized by said signals to reproduce said image with relatively increased luminosity.

18. A radiation image device comprising, light generation means responsive to radiation rays emanating from a subject area for producing light sources delineating an image of said area, a plurality of phototubes positioned for viewing said light sources and having electrical outputs responsive thereto, electric circuit means connected to said tubes and resolving said outputs in response to each light source into coordinate electric signals corresponding to the coordinates of position of each said light source, an oscilloscope connected to said circuit means and energized by said signals to reproduce said image, said circuit means including a discriminator circuit rendering said oscilloscope responsive primarily to unscattered radiation rays.

References Cited in the file of this patent

UNITED STATES PATENTS

| | | |
|---|---|---|
| 2,670,401 | Weinburg | Feb. 23, 1954 |
| 2,776,377 | Anger | Jan. 1, 1957 |
| 2,779,876 | Tobias | Jan. 29, 1957 |
| 2,830,187 | Scherbatskoy | Apr. 8, 1958 |